United States Patent [19]
Nakagawa et al.

[11] Patent Number: 5,426,600
[45] Date of Patent: Jun. 20, 1995

[54] DOUBLE PRECISION DIVISION CIRCUIT AND METHOD FOR DIGITAL SIGNAL PROCESSOR

[75] Inventors: Tetsuya Nakagawa, Koganei; Atsushi Kiuchi, Kunitachi, both of Japan

[73] Assignee: Hitachi America, Ltd., Tarrytown, N.Y.

[21] Appl. No.: 127,660

[22] Filed: Sep. 27, 1993

[51] Int. Cl.6 .............................................. G06F 7/52
[52] U.S. Cl. ................................. 364/764; 364/761; 364/766; 395/250; 395/400; 395/800
[58] Field of Search ............... 364/764, 736, 761, 765, 364/766

[56] References Cited

U.S. PATENT DOCUMENTS

| | | | |
|---|---|---|---|
| 4,498,135 | 2/1985 | Caudel | 395/800 |
| 4,503,500 | 3/1985 | Magar | 395/800 |
| 4,755,966 | 7/1988 | Lee et al. | 395/375 |
| 4,935,867 | 6/1990 | Wang et al. | 395/400 |
| 4,964,046 | 10/1990 | Mehrgardt et al. | 395/250 |
| 4,992,969 | 2/1991 | Yamahata | 364/761 |
| 5,016,210 | 5/1991 | Sprague et al. | 364/766 |
| 5,097,435 | 3/1992 | Takahashi | 364/766 |
| 5,107,453 | 4/1992 | Nomura | 364/764 |

*Primary Examiner*—Roy N. Envall, Jr.
*Assistant Examiner*—Emmanuel Moise
*Attorney, Agent, or Firm*—Flehr, Hohbach, Test, Albritton & Herbert

[57] ABSTRACT

An arithmetic operation execution unit includes a plurality of 2N bit data registers and an arithmetic logic unit (ALU). The execution unit is coupled to data busses each having a data path width of N bits for transferring data to and from the data registers. An XOR gate and inverter gate are provided for computing a quotient bit QB and a next ALU operation command bit QOP. A bit processing unit (BPU) shifts the QB bit generated during the previous instruction cycle into an output register during each instruction cycle. The execution unit responds to three predefined division instructions by configuring the ALU, BPU and XOR gate to perform three distinct functions. A first instruction performed for each division computation computes initial QB and QOP values. A second instruction is executed multiple times. Each execution of the second instruction computes one quotient bit QB, shifts a quotient bit computed in the prior instruction cycle into the least significant bit of a destination register, and also computes a QOP value that determines the next ALU operation to be performed. A final instruction shifts the last computed quotient bit into the destination register and also adds the divisor to the dividend register if the QOP value computed in the prior instruction cycle has a predefined value. For double precision division computations, each of the first and second instructions is followed by a "rotate with carry" instruction that shifts one bit of the dividend's lower 2N bits into a carry bit register, which is then shifted into the upper dividend by the next instruction executed.

8 Claims, 15 Drawing Sheets

|  | | Binary Representation | Decimal Representation |
|---|---|---|---|
| OPERATION: | Dividend: <br> Divisor: <br> Quotient: <br> Remainder: | 010110 <br> ÷ 011 <br> 011 <br> 000100 | 0.6875 <br> ÷ 0.75 <br> 0.75 <br> 0.125 |
| Instruction Cycle 1 | Executed as: <br> PR(1): | 010110 <br> - 011 <br> 010110 <br> + 101 <br> 111110 | 0.6875 <br> - 0.75 <br> 0.0625 |
| Instruction Cycle 2 | Q(1) <br> Q: [0][ ][ ] <br> PR(1),LSHFt: <br> PR(2): | 111100 ←0 <br> + 011 <br> 010100 | - 0.0625 <br> + 0.375 <br> 0.3125 |
| Instruction Cycle 3 | Q(2) <br> Q: [0][1][ ] <br> PR(2),LSHFt: <br> PR(3): | 101000 <br> + 101 <br> 010000 | 0.3125 <br> - 0.1875 <br> 0.125 |
| Instruction Cycle 4 | Q(3) <br> Q: [0][1][1] <br> PR(3),LSHFt: | 100000 <br> R | |

FIGURE 3

EXU Configuration for DIV_A(SRC1, SRC2) Instruction

EXU Configuration for DIV_B(SRC1, SRC2, DST) Instruction

| | |
|---|---|
| OPERATION: | Dividend: 010110     0.6875<br>Divisor: ÷ 011     ÷ - 0.75<br>Quotient: 100     - 1.00<br>Remainder: 111110     - 0.0625 |
| DIV_A | PR(1) = 010110, 011; QB=1, QOP=1 |
| DIV_B | 1 bit left Shift; 101100 ← 0 C; ADD 011; PR(2) = 010100; QB=0, QOP=1; Q = 1 |
| DIV_B | 1 bit left Shift; 101000 ← 0 C; ADD 011; PR(3) = 010000; QB=0, QOP=1; Q = 1 0 |
| DIV_C | 1 bit left Shift; 100000 ← 0 C; ADD 011; 110000; R=111110 = -0.0625; Q = 1 0 0 |

FIGURE 11

| FIGURE 14A |
|---|
| FIGURE 14B |
| FIGURE 14C |

DOUBLE PRECISION DIVISION CIRCUIT AND METHOD FOR DIGITAL SIGNAL PROCESSOR

The present invention relates generally to arithmetic execution circuitry for microprocessors and digital signal processors, and particularly to specialized circuitry for efficiently performing double precision division computations.

CROSS-REFERENCES TO RELATED APPLICATIONS

The following applications, which are assigned to the same assignee as the instant application, have been filed on the same date as the instant application and contain related subject matter. They are incorporated herein by reference.

Digital Signal Processor and Method for Executing DSP and RISC Class Instruction Defining Identical Data Processing or Data Transfer Operations, Kiuchi et al., Ser. No. 08/127,694, filed Sep. 27, 1993.

Digital Signal Processor and Method for Executing an Instruction with Variable Length Type Code, Baji et al., Ser. No. 08/127,938, filed Sep. 27, 1993.

Digital Signal Processor and Associated Method for Conditional Data Operation with No Condition Code Update, Kiuchi et al., Ser. No. 08/127,691 filed Sep. 27, 1993.

On Chip DMA Controller with Interrupt Functions for Digital Signal Processor, Baji, Ser. No. 08/127,685, filed Sep. 27, 1993.

Modulo Arithmetic Addressing Circuit, Shridhar et al., Ser. No. 08/127,685, filed Sep. 27, 1993.

Data Processor With Control Logic for Storing Operation Mode Status and Associated Method, Kiuchi, Ser. No. 08/127,431, filed Sep. 27, 1993.

On-Chip DMA Controller with Host Computer Interface, Baji et al., Ser. No. 08/127,429, filed Sep. 27, 1993.

Digital Signal Processor with No-Chip Address Decoder and Wait Status Controller, Baji, Ser. No. 08/127,682, filed Sep. 27, 1993.

BACKGROUND OF THE INVENTION

Conventional digital signal processors (DSPs) having an N-bit word length, only single precision division of a 2N-bit dividend by an N-bit divisor is supported by computational hardware for calculating one quotient bit during each instruction cycle. Typical word lengths used in most DSPs are 16, 24 and 32 bits. Generally, double precision division of a 4N-bit dividend by a 2N-bit divisor is not directly supported by computational hardware and therefore double precision division must be executed using software control techniques that are very slow because they require numerous computation cycles for the computation of each quotient bit.

The present invention provides direct hardware support for double precision division and enables double precision division to be executed at a rate of two instructions cycles for the computation of each quotient bit. In the preferred embodiment, to compute the 2N quotient result produced by dividing a 4N-bit dividend by a 2N-bit divisor requires just 4N+2 instruction cycles.

SUMMARY OF THE INVENTION

In summary, the present invention is an arithmetic operation execution circuit (herein called the execution unit) that efficiently performs single and double precision division computations. The execution unit includes a plurality of data registers that each store a value having 2N data bits and an arithmetic logic unit (ALU) having two input ports and shifter circuits for shifting data received on the two input ports. The execution unit is coupled to at least one data bus having a data path width of N bits for transferring data to and from the execution unit's data registers.

The execution unit further includes an exclusive OR (XOR) gate and inverter gate for computing one quotient bit QB and a next ALU operation command bit QOP, a QB bit register and a QOP bit register for storing the QOP and QB bits generated during each instruction cycle of the division computation, and a bit processing unit (BPU) that shifts the QB bit generated during the previous instruction cycle into an output register during each instruction cycle. The QOP bit, computed by the XOR gate from the sign bits of the divisor and the partial remainder value generated by the ALU during each instruction cycle, is used by the ALU to determine whether the ALU will perform an addition or subtraction operation during the next instruction cycle.

The execution unit responds to three predefined division instructions, herein called $DIV_{13}$ A, $DIV_{13}$ B and $DIV_{13}$ C, by configuring the ALU, BPU and XOR gate to perform three distinct functions. The $DIV_{13}$ A instruction is the first instruction performed for each floating point division computation, and causes the execution unit to be configured so as to compute initial QB and QOP values. The $DIV_{13}$ B instruction is executed multiple times to compute the quotient value, and if applicable, a remainder value. Each execution of the $DIV_{13}$ B instruction computes one quotient bit QB and stores in a specified destination register the quotient bit computed in the prior division instruction cycle. Each execution of the $DIV_{13}$ B instruction also computes a QOP value that determines the ALU operation to be performed in the next instruction cycle executed by the execution unit.

More particularly, during each execution of the $DIV_{13}$ B instruction the ALU adds the value in a specified divisor register to a specified dividend register if the QOP bit value computed in the prior instruction cycle has a first value (e.g., 1) and otherwise it subtracts the specified divisor register from the specified dividend register. The value computed by the ALU is stored back into the specified dividend register, the sign bits of the computed value and the divisor are exclusive-ORed to generate a new QOP value, and a new QB value is generated by inverting the value generated by the exclusive-OR operation. The generated QOP and QB values are stored in respective bit registers for use in the next instruction cycle. During each execution of the $DIV_{13}$ B instruction the BPU shifts the value in the destination register one bit to the left and inserts the QB value computed in the previous instruction cycle into the least significant bit position of the destination register.

The $DIV_{13}$ B instruction is executed N-1 times when the quotient being computed has N bits and it is executed 2N-1 times when the quotient being computed has 2N bits. The $DIV_{13}$ C instruction is the final instruction executed to complete the division computation. The $DIV_{13}$ C instruction causes the BPU to shift the contents of the destination register by one bit and to store the last quotient bit, computed in the previous instruction cycle, in the least significant bit of the quotient. The $DIV_{13}$ C instruction also causes the ALU to add the divisor to the dividend register if the QOP value computed in the prior $DIV_{13}$ B instruction cycle has a value of "1". The number of instruction cycles required to divide a 2N bit dividend by an N bit divisor to produce an N bit quotient and an N bit remainder is N+2: one $DIV_{13}$ A instruction, N-1 $DIV_{13}$ B instructions, one $DIV_{13}$ C instruction, and one "repeat" instruction for specifying the number of times the $DIV_{13}$ B instruction is to be repeated. For double precision division computations the dividend has 4N bits and is stored in two data registers, the divisor has 2N bits, the quotient being computed has 2N bits and the remainder being computed has 2N bits. For double precision division computations, each $DIV_{13}$ A and $DIV_{13}$ B instruction is followed by a "rotate with carry" instruction that shifts one bit of the dividend's lower 2N bits into a carry bit register. That bit is then shifted from the carry bit register into the upper dividend register by the next $DIV_{13}$ B or $DIV_{13}$ C instruction that is executed. In all other respects, the double precision division computation procedure is the same as the procedure for the single precision division computation procedure. The number of computation instruction cycles needed to divide a 4N bit dividend by a 2N bit divisor to produce a 2N bit quotient and a 2N bit remainder is 4N+2: one $DIV_{13}$ A and one initial rotate instruction, 4N-2 for the repeated $DIV_{13}$ B and rotate instructions, one $DIV_{13}$ C instruction, and one "repeat" instruction for specifying the number of times to repeat the $DIV_{13}$ B and rotate instructions.

BRIEF DESCRIPTION OF THE DRAWINGS

Additional objects and features of the invention will be more readily apparent from the following detailed description and appended claims when taken in conjunction with the drawings, in which:

FIG. 3 is a flow chart corresponding to the sequence of operations performed by the present invention to divide a specified positive dividend by a specified positive divisor.

FIG. 11 is a flow chart of operations performed by the present invention to divide a specified positive 2N bit dividend by a specified negative N bit divisor.

DESCRIPTION OF THE PREFERRED EMBODIMENT

Execution Unit Architecture

Figure 1:
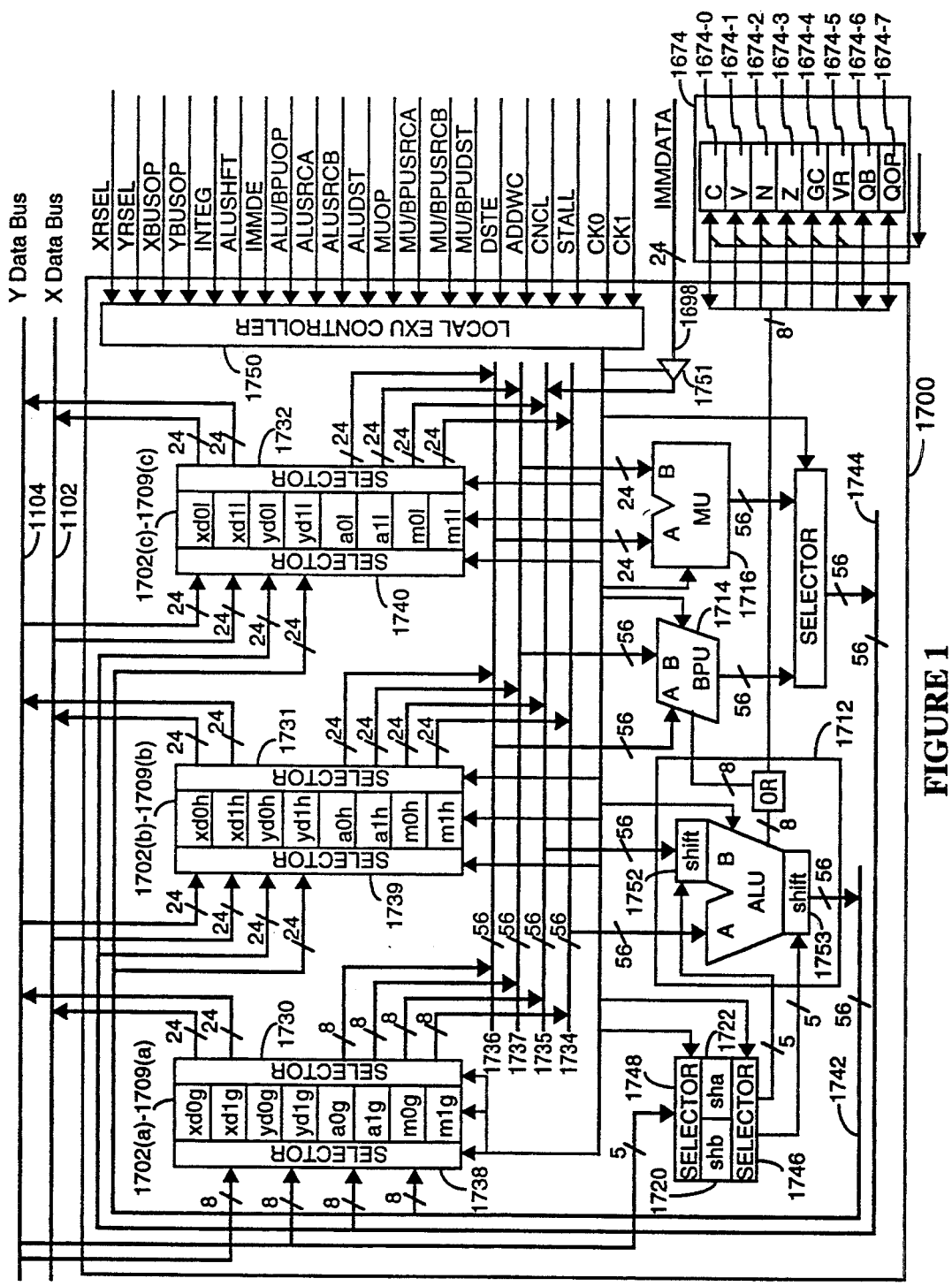
FIG. 1 is a block diagram of an arithmetic execution unit suitable for use in a digital signal processor.

FIG. 1 shows the arithmetic execution unit 1700 used in the preferred embodiment, excluding special circuitry for supporting division computations. The arithmetic execution unit 1700 of the preferred embodiment is implemented in a digital signal processor having parallel X and Y data busses 1102, 1104. In the preferred embodiment the X and Y data busses are each 24 bits wide, and thus "N" is equal to 24. In two other preferred embodiments N is equal to 16 and 32, respectively.

A set of eight registers 1702–1709 are used as sources and destinations for arithmetic computations. The eight registers are divided are labeled xd0, xd1, yd0, yd1, a0, a1, m0 and m1. Each register is 56 bits wide, including 24 low order bits, 24 high order bits, and 8 guard bits. For data transfers to and from the X and Y busses, the eight registers are each accessed as three sub-registers. For example, the xd0 register 1702 comprises registers xd0g 1702(a), xd0h 1702(b) and xd0l 1702(c).

Shift value registers 1720 and 1722 are five bit registers for storing shift control values to be used in conjunction with the ALU's input and output shifters 1752 and 1753. Condition code register (ccr) 1674 stores eight condition code values (C,V,N,Z,GC,VR,QB and QOP) representing various conditions existing after predefined ALU and BPU operations have been performed. The condition code register 1674 includes eight individual bit registers 1674-0 to 1674-7. Use of the C, QB and QOP condition code values will be explained in more detail below.

The primary functional components of the execution unit 1700 are an arithmetic logic unit (ALU) 1712, a bit processor unit (BPU) 1714, and a multiplier unit (MU) 1716.

The local execution unit (EXU) controller 1750 generates source control signals which are provided to the selectors 1730–1732 in response to the ALUSRCA, ALUSRCB, MU/BPUSRCA, and MU/BPUSRCB signals.

For the ALUSRCA signal, the source control signals generated by the local execution unit (EXU) controller 1750 control the selectors 1730–1732 to output onto the 56 bit internal bus 1734 the 56 bits of data stored by whichever of the register sets 1702–1709 (xd0-m1) was designated by the ALUSRCA signals. For the ALUSRCB signal, these control signals control the selectors 1730–1732 to output onto the 56 bit internal bus 1735 the 56 bits of data stored by whichever of the register sets 1702-1709 (xd0-m1) was designated by the ALUSRCB signal.

For the MU/BPUSRCA signal, these control signals control the selectors 1730-1732 to output onto the 56 bit internal bus 1736 the 56 bits of data stored by whichever of the register sets 1702-1709 (xd0-m1) was designated by the MU/BPUSRCA signal. And finally, for the MU/BPUSRCB signal, these control signals control the selectors 1730-1732 to output onto the 56 bit internal bus 1737 the 56 bits of data stored by whichever of the register sets 1702-1709 (xd0-m1) was designated by the MU/BPUSRCB signal.

The local execution unit (EXU) controller 1750 also generates destination control signals which are provided to the selectors 1738-1740 in response to the ALUDST and MU/BPUDST signals. For the ALUDST signal, the control signals generated by the local execution unit (EXU) controller 1750 control the selectors 1738-1740 to input 56 bits of data from the 56 bit ALUDST bus 1742 to whichever of the register sets 1702-1709 (xd0-m1) was designated by the ALUDST signal. For the MU/BPUDST signal, the control signals generated by the local execution unit (EXU) controller 1750 control the selectors 1738-1740 to input 56 bits of data from the 56 bit MU/BPUDST bus 1744 to whichever of the register sets 1702-1709 (xd0-m1) was designated by the MU/BPUDST signal.

The execution unit (EXU) 1700 is designed to perform single ALU, BPU, or MU operations, parallel ALU and BPU operations (e.g., division operations), and parallel ALU and MU operations. Furthermore, this configuration is designed to provide up to two source registers and a separate destination register for each ALU, BPU, or MU operation. In addition, each of the 8 registers 1702-1709 (xd0-md1) can be a first source (A), a second source (B), or a destination for an operation by the ALU 1712, the BPU 1714 or the MU 1716.

The operation to be performed by the execution unit 1700 during each instruction cycle are specified by signals received from the DSP's instruction decoders and program control logic and decoder circuits 1600 (see FIG. 2) which are not shown here. The received control signals include: a 5 bit ALU and BPU operation (ALU/BPUOP) signal, (b) a 3 bit ALU shift function (ALUSHFT) signal, (c) a 1 bit add with carry or subtract with borrow (ADDWC/SUBWB) signal, (d) a 1 bit immediate data enable or ALU source B enable (IMMDE/SRCBE) signal, (e) a 1 bit integer or fraction arithmetic operation (INTEG/FRAC) signal, and (f) a 1 bit ALU/BPU destination update enable and disable (DSTE/DSTD) signal.

The ALU/BPUOP signal specifies the operations to be performed by the ALU 1712 and BPU 1714. The ALUSHFT signal specifies the shift functions to be performed by the ALU's input and output shift circuits 1752, 1753. The ADDWC/SUBWB signal, when enabled, instructs the ALU 1712 to perform additions or subtractions defined by the ALU/BPUOP signal with a carry or borrow. The IMMDE/SRCBE signal is for controlling the ALU 1712 to use as an operand source immediate data from bus 1698. The INTEG/FRAC signal is for controlling the ALU 1712 to use integer or fraction arithmetic for the ALU operation defined by the ALU/BPUOP signal. The DSTE/DSTD signal is for controlling the destination registers designated by the ALUDST signal to store (DSTE) or not store (DSTD) the result produced by the ALU 1712 for an operation.

The local execution unit (EXU) controller 1750 generates shift control signals provided to the ALU 1712 and the selector 1746 in response to the ALUSHFT signal. The shift control signals received by the selector 1746 control the selector 1746 to provide the shifting code stored by one of the shift registers 1720 or 1722 (sha and shb) to the source B shifter 1752 of the ALU 1712 or to the output shifter 1753 of the ALU 1712.

The local execution unit (EXU) controller 1750 generates data transfer control signals which are provided to the selectors 1730-1732 and 1738-1740 in response to the XRSEL, YRSEL, XDBUSOP, and YDBUSOP signals. The XDBUSOP signal may indicate that data is to be stored or pushed to data memory (not shown). If this is the case and the XRSEL signal specifies one of the data registers 1702(a)-1709(c) (xd0g-m1l) as the source of the data to be stored in data memory, then the local execution unit (EXU) controller 1750 generates a control signal sent to the appropriate selector 1730, 1731, 1732, or 1746 for controlling that selector to output onto the X data bus 1102 the data stored by whichever of the registers was designated by the XRSEL signal.

The XDBUSOP signal may also indicate that data is to be loaded or popped from data memory to a register or that immediate data is to be loaded to a register. In that case the XRSEL signal specifies one of the registers 1702(a)-1709(c) (xd0g-m1l) or one of the registers 1720 and 1722 (sha and shb) as the destination of the data transfer and the local execution unit (EXU) controller 1750 generates a control signal sent to the appropriate selector 1738, 1739, 1740, or 1748 for controlling that selector to input data from the X data bus 1102 to whichever of the registers was designated by the XRSEL signal.

The YDBUSOP signal and YRSEL signals are decoded and used by the local EXU controller 1750 in much the same way as was described above for the XDBUSOP and YRSEL signals, except that data transfers controlled by the YDBUSOP signal and YRSEL signals are transmitted over the Y data bus 1104.

If the XDBUSOP signal indicates that data is to be moved from one register to another and the XRSEL signal specifies one of the data registers 1702(a)-1709(c) (xd0g-m1l), then the local EXU controller 1750 generates a control signal sent to the appropriate selector 1730, 1731, or 1732 for controlling that selector to output data onto the X data bus 1102 to whichever of the data registers 1702(a)-1709(c) (xd0g-m 1l) was designated by the XRSEL signal. Furthermore, if the YRSEL signal in this case specifies one of the data registers 1702(a)-1709(c) (xd0g-m1l), then the local EXU controller 1750 generates a control signal sent to the appropriate selector 1738, 1739, or 1740 for controlling that selector to input data from the X data bus 1102 to whichever of the registers was designated by the YRSEL signal.

The local EXU controller 1750 also receives the clock signals CK0 and CK1. These signals are used by the local EXU controller 1750 for proper timing in generating the control signals described above.

The local execution unit (EXU) controller 1750 may also receive a CANCEL signal. In response, it generates control signals for controlling the data registers 1702(a)-1709(c) and the shift control registers 1720 and 1722 (sha and shb) to not store any data received from the X data bus 1102, Y data bus 1104, internal ALUDST bus 1742, or internal MU/BPUDST bus 1744 via the selectors 1738–1740 or 1748.

Furthermore, the local execution unit (EXU) controller 1750 may receive a STALL signal. When it does receive this signal, it generates control signals for controlling the data registers 1702(a)–1709(c) and the shift control registers 1720 and 1722 (sha and shb) to not store any data received from the X data bus 1102, Y data bus 1104, internal ALUDST bus 1742, or internal MU/BPUDST bus 1744 via the selectors 1738–1740 or 1748.

The MUOP signal is for specifying the operation, if any, to be performed by the multiplier unit (MU) 1716. The MU/BPUSRCA, MU/BPUSRCB, and MU/BPUDST signals are for controlling selected ones of the data registers 1702–1709 to act as sources or destinations for MU or BPU operations.

Division Execution Logic

Figure 2:
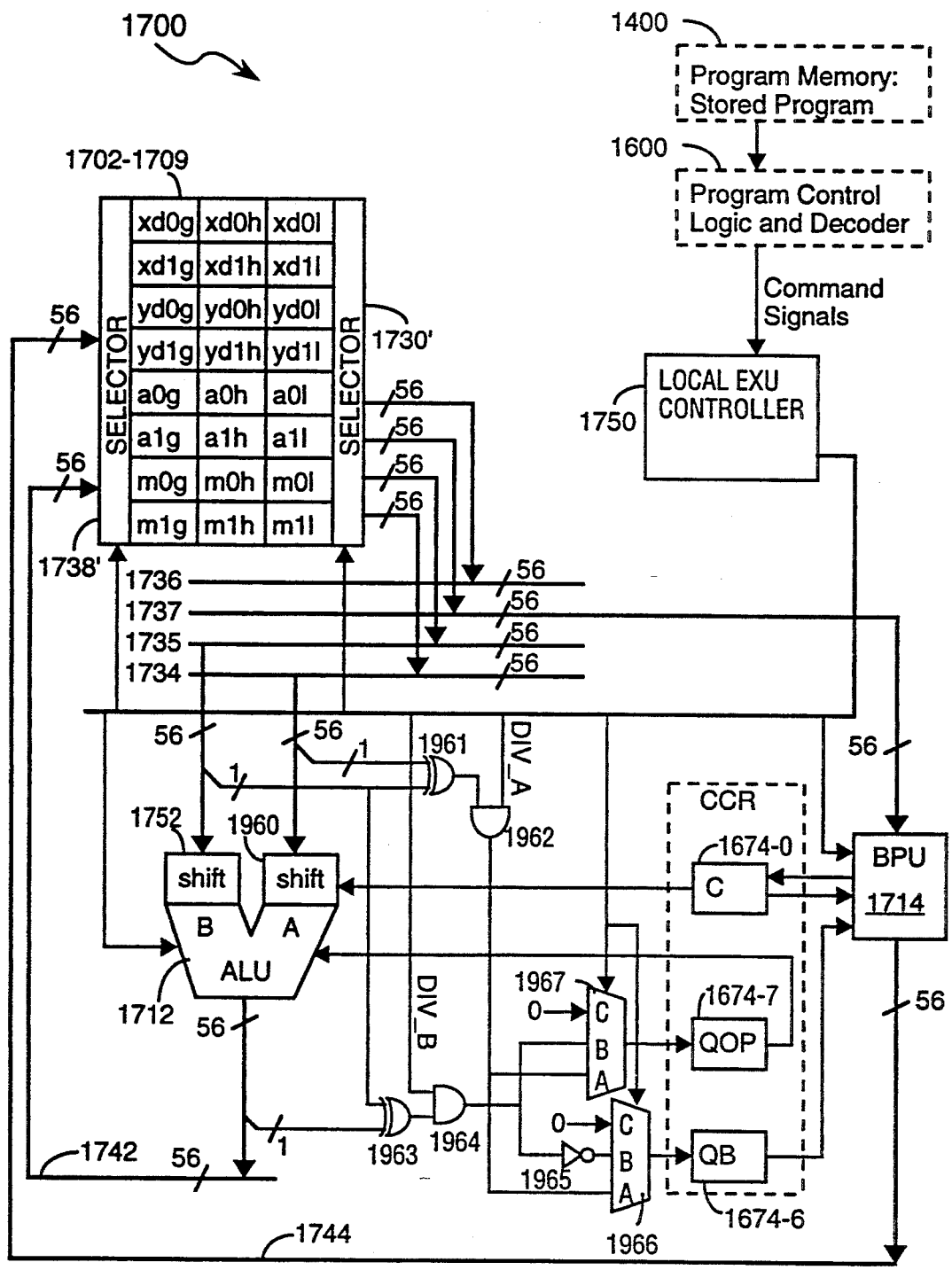
FIG. 2 is a block diagram of the arithmetic execution unit shown in FIG. 1 with additional circuitry for supporting single and double precision division computations.

FIG. 2 shows the portions of the execution unit 1700 that are utilized for performing division computations. The source and destination registers 1702–1709 for each division operation are accessed as 56-bit values for division operations. The three input selectors 1738, 1739 and 1740 for the data registers are shown in FIG. 2 as input selector 1738', and the three output selectors 1730, 1731 and 1732 for the data registers are shown in FIG. 2 as output selector 1730'.

The ALU 1712 when configured for division computations has both A and B input shifters 1752 and 1960 and does not use an output shifter. The A input shifter is used in division operations to perform a "left shift with carry" operation. The Carry (C) condition code register 1674-0 is coupled to the A input shifter 1960 such that the Carry (C) bit value in register 1674-0 can be shifted into the least significant bit position of the ALU's A input value under the control of the local EXU controller 1750.

The circuitry used to generate bit values to be stored in the QB and QOP registers 1674-6 and 1674-7 is as follows. An exclusive-OR (XOR) gate 1961 exclusive-ORs the sign bits of the A and B inputs to the ALU from internal busses 1734 and 1735, respectively. The output from XOR gate 1961 is ANDed by AND gate 1962 with a first ALU control signal, $DIV_{13}$ A, that is enabled only when a predefined "$DIV_{13}$ A" instruction is being performed. A second XOR gate 1963 exclusive-ORs the sign bits of the ALU's B input (on data bus 1735) and the ALU's output (on data bus 1742), and the output from XOR gate 1963 is ANDed by AND gate 1964 with a second ALU control signal, $DIV_{13}$ B, that is enabled only when a predefined "$DIV_{13}$ B" instruction is being performed. An inverter 1965 inverts the signal generated by XOR gate 1963 and AND gate 1964. The "sign bit" of each 56-bit value is herein defined to be bit 47 of that value, where bit 0 is the least significant bit and bit 55 is the most significant bit.

A first multiplexer 1966 has three input ports labeled A, B, C. The A, B, and C input ports of the first multiplexer 1966 are coupled to a "0" bit signal, the XOR gate 1961 output and the inverted XOR gate 1963 output, respectively. The A, B and C input ports of a second multiplexer 1967 are coupled to a "0" bit signal, the XOR gate 1961 output and the XOR gate 1963 output, respectively.

A control signal from the local EXU controller 1750 enables the first and second multiplexers 1966 and 1967 to pass: (A) the signals on their A input ports when execution unit 1700 executes the $DIV_{13}$ A instruction, (B) the signals on their B input ports when the execution unit executes the $DIV_{13}$ B instruction, and (C) the signals on their C input ports when the execution unit executes the $DIV_{13}$ C instruction. The output of the first multiplexer 1966 is stored in the QB register 1674-6, and the output of the second multiplexer 1967 is stored in the QOP register 1674-7.

The value stored in the QOP register 1674-7 is used to determine whether the ALU performs an addition or subtraction operation when the ALU executes a predefined division operation, herein called the $DIV_{13}$ B instruction or operation. More specifically, when the QOP value is true, the ALU's B input is added to the ALU's A input to produce an output value; when the QOP value is false, the ALU's B input is subtracted from the ALU's A input to produce an output value. When the ALU executes the $DIV_{13}$ C operation, the QOP register value determines whether the ALU (1) shifts the ALU's B input by one bit and adds it to the A input to generate an output value (when QOP is true), or (2) outputs the A input (when QOP is false).

The QB register 1674-6 is coupled to the BPU 1714 and is shifted by the BPU 1714 into the least significant bit position of the BPU's output when the BPU executes the $DIV_{13}$ B and $DIV_{13}$ C instructions in conjunction with the ALU.

Theory of Operation

Division Operation for Positive Numbers

The division function of the preferred embodiment uses a non-restoring technique, which in the present context means that the contents of the source register in which dividend value is stored before execution of the division operation is modified by the division operation. The division technique of the present invention will first be described for the case in which the dividend, divisor, quotient and remainder are all positive. Subsequently, the division technique when using positive and negative numbers will be explained.

FIG. 3 shows a simple example in which a positive dividend is divided by a positive divisor. In this example both numbers are shown in binary representation format and the dividend is 6 bits and the divisor is 3 bits long. Thus, for the purposes of this example, we are use a word length, N, of 3 bits and the result of the division will be a 3-bit quotient and a 3-bit remainder. If we assume that the dividend and divisor are normalized floating point numbers representing factional values, the dividend value in the example is equal to 0.6875 and the divisor is equal to 0.75. Thus, the quotient and remainder produced by the division procedure should be equal to 0.75 and 0.125, respectively.

In the first instruction cycle the 3-bit divisor is subtracted from the three most significant bits of the 6-bit dividend. This subtraction is performed by adding the 2's complement of the divisor to the dividend. The result, which is called a partial remainder and is herein labelled PR(1), is equal to "111110", which is negative. This means that the divisor (0.75) is larger than the dividend (0.6875), and that the most significant bit of the quotient Q is equal to "0", since the quotient is less than 1. In the next instruction cycle the sign bit of the partial remainder is inverted, and the resulting zero bit is stored in the destination register, herein called Q.

Then, in a second instruction cycle, the partial remainder PR(1) from the prior instruction cycle is shifted one bit to the left and the divisor is subtracted from the three most significant bits of the shifted partial remainder. Note that this operation is equivalent to adding the one bit right-shifted divisor (half the divisor value, 0.375) to the unshifted remainder (−0.0625). That is, the resulting next partial remainder is equal to the amount which is obtained by subtracting half the divisor (0.375) from the dividend (0.6875). Since this is a positive value (0.3125), the next bit of the quotient Q is equal to "1". In the next instruction cycle the sign bit of the partial remainder is inverted, and the resulting "1" bit is stored in the destination register Q.

In the third instruction cycle the partial remainder PR(2) from the prior instruction cycle is shifted one bit to the left and the divisor is subtracted from the three most significant bits of the shifted partial remainder. Since the resulting partial remainder is positive (0.125), the least significant bit of the quotient is equal to "1". In the next instruction cycle the sign bit of the partial remainder is inverted, and the resulting "1" bit is stored in the destination register Q.

Thus the expected quotient 011 (0.75) is obtained, and the expected remainder 100 is obtained by shifting the final computed remainder value one bit to the left.

The procedure described above for dividing a dividend of 2N bits by a divisor of N bits can be represented by the following pseudocode procedure:

---
Pseudocode For 2N/N Positive Number Division Procedure
---

1) Subtract the N bit divisor from the N most significant bits of the 2N bit dividend to generate a first partial remainder PR(1).
   If PR(1) > 0{
     Set most significant bit of quotient Q equal to 1}
   Otherwise{
     Set most significant bit of quotient Q equal to 0}

2) Repeat the following N-1 times for i=1 to N-1:
   If PR(i) ≧ 0  {
     Shift PR(i) one bit to the left and subtract the N bit divisor from the N most significant bits of the shifted partial remainder to generate PR(i+1).
     If PR(i+1) > 0{
       Set next most significant bit of Q = 1}
     Otherwise{
       Set next most significant bit of Q = 0}
     }
   Else   {    /*PR(i) < 0*/
     Shift PR(i) one bit to the left and add the N bit divisor to the N most significant bits of the shifted partial remainder to generate PR(i+1).
     If PR(i+1) > 0{
       Set next most significant bit of Q = 1}
     Otherwise{
       Set next most significant bit of Q = 0}
     }

3) If PR(N) ≧ 0{
     Shift PR(N) one bit to the left. The remainder value for the division operation is equal to the N most significant bits of the shifted PR(N).
     }
   Else    {    /*PR(N) < 0*/
     Shift PR(N) one bit to the left, shift the divisor one bit to the left, and add the one bit left shifted N bit divisor to the N most significant bits of the shifted partial remainder. The N most significant bits of the resulting value are output as the remainder value for the division operation.
     }

Division Operation for Signed Numbers

Extending the above described division procedure to handle signed numbers is relatively straightforward. The extended division procedure reduces the absolute value of the partial remainder with each step of the procedure until the absolute value of the partial remainder is less than the absolute value of the divisor. In the following explanation, all dividends, divisors, quotients and remainders are 2's complements numbers. There are four possible combinations of signed values for a division computation since both the dividend and divisor can be positive or negative.

Consider the case where a divisor is positive. A partial remainder PR(i+1) is generated at each step of the division procedure by adding or subtracting the divisor to or from the previous partial remainder PR(i). What we need to determine are (1) what is the quotient bit Q(i+1) resulting from this step and (2) what is the next operation for generating PR(i+2). When the dividend is positive, the answers to those two questions are answered in previous section of this document. That is, if PR(i+1) is positive, then Q(i+1)=1 and the next operation is subtraction; and if PR(i+1) is negative, then Q(i+1)=0 and the next operation is addition.

When the dividend is negative and the divisor is positive, the quotient bit generated and the next ALU operation are determined as follows. If the partial remainder PR(i+1) is negative, Q(i+1)=0 and the next operation is addition for reducing the absolute value of the negative partial remainder PR(i+1) by adding the positive divisor. If the partial remainder PR(i+1) is positive, Q(i+1)=1 and the next operation is subtraction for reducing the absolute value of the negative partial remainder PR(i+1) by subtracting the positive divisor.

Next consider the case where the divisor is negative and tile dividend is positive. If the partial remainder PR(i+1) is positive, the next operation for reducing the absolute value of the partial remainder is addition, because adding a negative number to the positive remainder will reduce the partial remainder's absolute value, and the next quotient bit Q(i+1)=0. If the partial remainder PR(i+1) is negative, the next operation for reducing the absolute value of the partial remainder is subtraction, because subtracting a negative number from the negative remainder will reduce the partial remainder's absolute value, and the next quotient bit Q(i+1)=1.

When both the divisor and dividend are negative, if the partial remainder PR(i+1) is positive, the next operation for reducing the absolute value of the partial remainder is addition, because adding a negative number to the positive remainder will reduce the partial remainder's absolute value, and the next quotient bit Q(i+1)=0. If the partial remainder PR(i+1) is negative, the next operation for reducing the absolute value of the partial remainder is subtraction, because subtracting a negative number from the negative remainder will reduce the partial remainder's absolute value, and the next quotient bit Q(i+1)=1.

Table 1 summarizes the above discussion. Looking closely at Table 1, it can be seen that the quotient bit Q(i+1) and the next operation are determined solely by the sign bit of the divisor and the sign bit of the partial remainder PR(i+1) and that the sign bit of the dividend is irrelevant to those determinations.

Table 2 is obtained from Table 1 by eliminating the dividend sign bit column and by representing subtraction with a "0" and addition with a "1". Table 2 shows that Q(i+1) is obtained by performing an exclusive-NOR on the sign bits of the divisor and the partial remainder PR(i+1). The next operation to perform is specified by the inverse of Q(i+1).

TABLE 1

| The sign bit of Divisor | The sign bit of Dividend | The sign bit of PR(i+1) | The Quotient Bit Q(i+1) | Next Operation |
|---|---|---|---|---|
| 0 | 0 | 0 | 1 | SUB |
| 0 | 0 | 1 | 0 | ADD |
| 0 | 1 | 0 | 1 | SUB |
| 0 | 1 | 1 | 0 | ADD |
| 1 | 0 | 0 | 0 | ADD |
| 1 | 0 | 1 | 1 | SUB |
| 1 | 1 | 0 | 0 | ADD |
| 1 | 1 | 1 | 1 | SUB |

TABLE 2

| The sign bit of Divisor | The sign bit of PR(i+1) | The Quotient bit Q(i+1) | Next Operation QOP |
|---|---|---|---|
| 0 | 0 | 1 | 0:SUB |
| 0 | 1 | 0 | 1:ADD |
| 1 | 0 | 0 | 1:ADD |
| 1 | 1 | 1 | 0:SUB |

The procedure described above for dividing a signed dividend of 2N bits by a signed divisor of N bits can be represented by the following pseudocode procedure:

---
Pseudocode For 2N/N Signed Number Division Procedure
---

1) Compute exclusive-OR of sign bit of divisor and sign bit of dividend and assign the resulting value to the most significant bit of the quotient and to a flag herein called QOP.
   QOP(1)=Q(1)=XOR(sign bit of Divisor, sign bit of Dividend)
   PR(1)=the dividend 2) Repeat the following N-1 times for i=1 to N-1:
   If QOP(1)=0{
      Shift PR(i) one bit to the left and subtract the N bit divisor from the N most significant bits of the shifted partial remainder to generate PR(i+1).
   }
   Else  {    /*QOP(1)=1*/
      Shift PR(i) one bit to the left and add the N bit divisor to the N most significant bits of the shifted partial remainder to generate PR(i+1).
   }
   Q(i+1)=XOR(sign bit of Divisor, sign bit of PR(i+1))
   QOP=~Q(i+1)

3) If QOP(N)=0{
      Shift PR(N) one bit to the left. The remainder value for the division operation is equal to the N most significant bits of the shifted PR(N).
   }
   Else  {    /*QOP(N)=1*/
      Shift PR(N) one bit to the left, shift the divisor one bit to the left, and add the one bit shifted N bit divisor to the N most significant bits of the shifted partial remainder. The N most significant bits of the resulting value are output as the remainder value for the division operation.
   }

Figure 4:
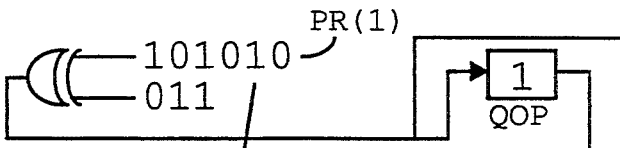
FIG. 4 is a flow chart corresponding to the sequence of operations performed by the present invention to divide a specified negative dividend by a specified positive divisor.

FIG. 4 shows an example in which a 6 bit negative dividend is divided by a positive 3 bit divisor. The division procedure described above is used in this example. The dividend in this example is equal to −0.6875 (101010) and is divided by 0.75 (011). Thus, the quotient and remainder produced by the division procedure should be equal to −1 (100) and 0.0625 (000010), respectively.

In the first instruction cycle the exclusive-OR of the sign bits of the dividend and divisor is computed. The result is a value of 1, indicating that the quotient is negative. This result is stored in the QOP flag register to indicate that the next operation is addition, for reducing the absolute value of the negative divided by adding the positive divisor. The result of the XOR computation (1) is also stored in the most significant bit of the quotient, Q(1), at the beginning of the next instruction cycle.

In the second instruction cycle the dividend PR(1) is shifted one bit to the left. Since QOP equals 1, the divisor is added to the three most significant bits of the shifted PR(1) value. The result, PR(2) is negative (101100). Next, the exclusive-OR of the sign bit of PR(2) and the divisor is computed. The result is a value of 1, which indicates that the next operation should be an addition. Thus, the result of the XOR computation is stored in the QOP flag register to indicate that the operation performed in the next computation cycle should be addition, and the inverse of the XOR computation result is stored in the next bit of the quotient, Q(2).

In the third instruction cycle the partial remainder PR(2) is shifted one bit to the left. Since QOP equals 1, the divisor is added to the three most significant bits of the shifted PR(2) value. The result, PR(3) has a value of 110000, which is negative. Next, the exclusive-OR of the sign bit of PR(3) and the divisor is computed. The result is a value of 1, which indicates that the next operation should be an addition. The result of the XOR computation is stored in the QOP flag register to indicate that the operation to be performed in the last computation cycle should be addition, and the inverse of the XOR computation result is stored in the next bit of the quotient, Q(3). The 3-bit quotient produced is equal to −1 (100), as expected.

In the fourth instruction cycle the partial remainder PR(3) is shifted one bit to the left. Since QOP equals 1, the one bit left shifted divisor is added to the two most significant bits of the shifted PR(3) value. The three most significant bits of the result (010000) is the expected remainder (010) that is the least significant bits of 000010 (which is equal to 0.0625).

Division Operation for Signed 2N Bit Dividend, Divisor and Quotient

In the discussion up to this point we have explained how to perform division computations in which the dividend is 2N bits long and the divisor, quotient and remainder are all 2N bits long.

Division computations in which the dividend, divisor and quotient are all 2N bits long are useful when the same accuracy for a quotient as that of the dividend and divisor is needed. During this division computation the dividend is treated as 4N bit value in which the least significant 2N bits are all equal to 0. This is accomplished by shifting a 0 bit from the Carry register into the least significant bit position of the dividend during each DIV$_{13}$ B and DIV$_{13}$ C operation. The resulting 2N bit remainder value in the dividend register is actually a 4N bit value in which the first 2N bits are 0's and the last 2N bits are the remainder value left in the dividend register. In most digital signal processing applications, the remainder value generated by the 2N/2N division procedure is assumed to be so small as to be meaningless and will therefore be discarded.

The procedure described above for dividing a signed dividend of 2N bits by a signed divisor of 2N bits can be represented by the following pseudocode procedure:

| Pseudocode For 2N/2N Signed Number Division Procedure |
| --- |
| 1) Compute exclusive-OR of sign bit of divisor and sign bit of dividend and assign the resulting value to the most significant bit of the quotient and to a flag herein called QOP.<br>QOP(1)=Q(1)=XOR(sign bit of Divisor, sign bit of Dividend)<br>PR(1)=the dividend |
| 2) Repeat the following 2N-1 times for i=1 to 2N-1:<br>If QOP(i)=0{<br>   Shift PR(i) one bit to the left and subtract the 2N bit divisor from the 2N bit long shifted partial remainder to generate PR(i+1).<br>}<br>Else  {   /*QOP(i)=1*/<br>   Shift PR(i) one bit to the left and add the 2N bit divisor to the 2N bit long shifted partial remainder to generate PR(i+1).<br>}<br>Q(i+1)=XOR(sign bit of Divisor, sign bit of PR(i+1))<br>QOP(i+1)=~Q(i) |

Hardware Implementation of Division Procedures

Referring to FIG. 2 and FIGS. 5, 6 and 7, the DSP of the present invention provides three division instruction primitives, plus a standard "rotate with carry" primitive instruction (herein designated the "<<RC" instruction), to control all necessary operations of the ALU 1712 and BPU 1714 to implement the above described division procedures, as well as for implementing a hardware based procedure for dividing a 4N bit divided by a 2N bit divisor to produce a 2N bit quotient and 2N bit remainder. Each of the three primitives, herein called $DIV_{13}$ A, $DIV_{13}$ B and $DIV_{13}$ C, completes its operation in one instruction cycle and computes one quotient bit per instruction cycle (except when dividing a 4N bit dividend by a 2N bit divisor, in which case two instruction cycles are required to compute each quotient bit). By combining the 3 primitive division instructions (and the rotate with carry instruction for double precision division computations) properly in an instruction program stored in the DSP's program memory 1400, three kinds of division functions with different bit accuracies can be performed:

1. Divide a 2N bit dividend by a N bit divisor to produce a N bit quotient and a N bit remainder.
2. Divide a 2N bit dividend by a 2N bit divisor to produce a 2N bit quotient and no remainder.
3. Divide a 4N bit dividend by a 2N bit divisor to produce a 2N bit quotient and a 2N bit remainder.

Figure 5:
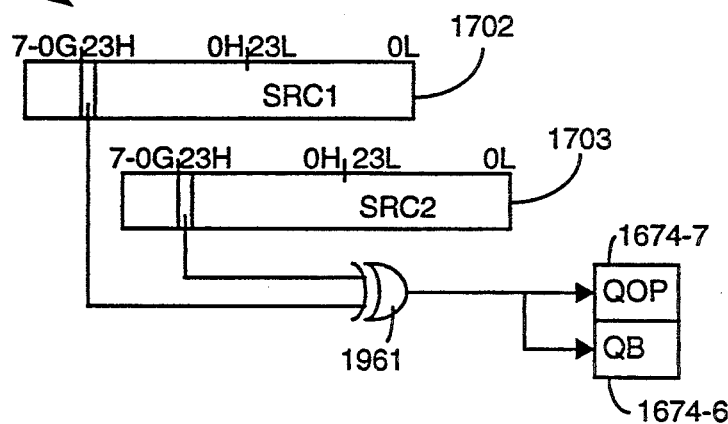
FIG. 5 is a schematic representation of the execution unit of the present invention as configured to perform a first predefined division instruction.

Referring to FIGS. 2 and 5, the $DIV_{13}$ A instruction causes the execution unit 1700 to be configured (by control signals from the local EXU controller 1750) so that:

(A) two distinct ones of the registers 1702–1709, SRC1 and SRC2, specified as parameters by the $DIV_{13}$ A command are asserted on internal data busses 1734 and 1735; and (B) the sign bits of the SRC1 and SRC2 values (i.e., bit 47, where bit 0 is the least significant bit and bit 55 is the most significant bit of both data 56-bit words) are exclusive-ORed by XOR gate 1961, and the 1-bit result produced by of the XOR gate 1961 is stored in both the QB and QOP condition code bit registers 1674-6 and 1674-7.

Figure 6:
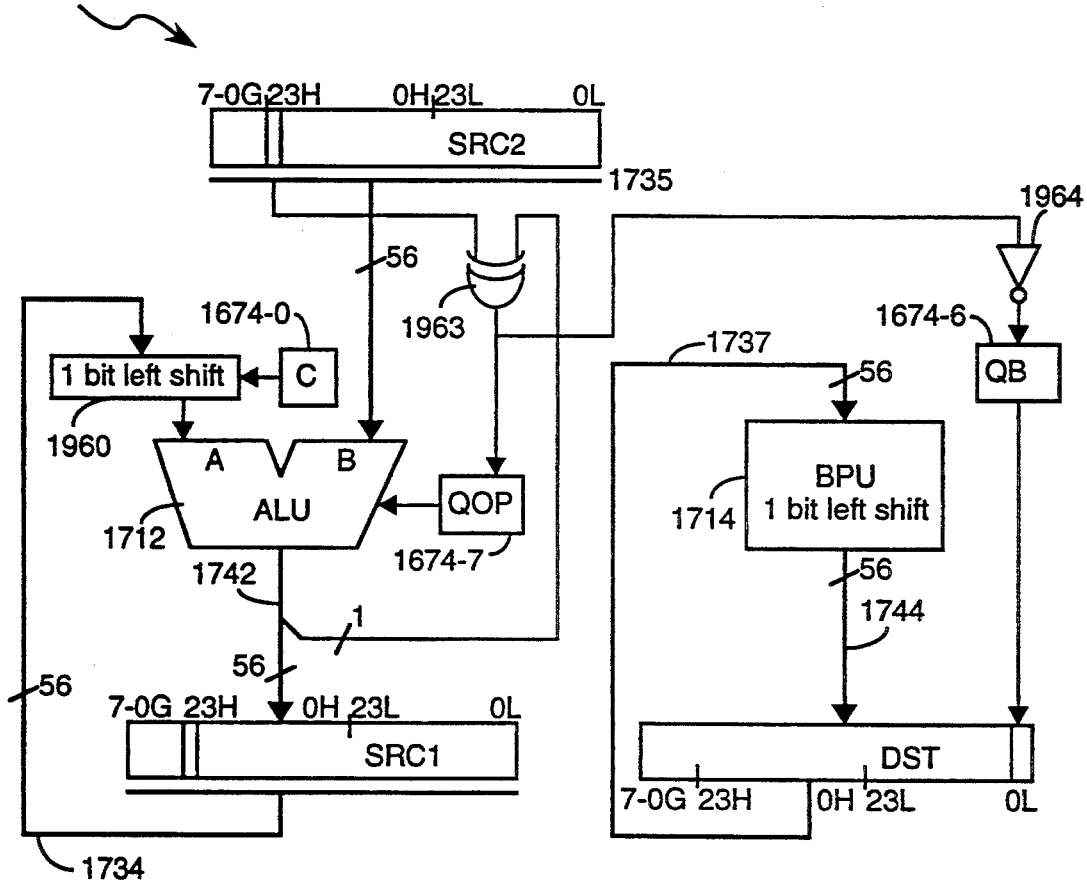
FIG. 6 is a schematic representation of the execution unit of the present invention as configured to perform a second predefined division instruction.

Referring to FIGS. 2 and 6, the $DIV_{13}$ B instruction causes the execution unit 1700 to be configured (by control signals from the local EXU controller 1750) so that:

(A) two distinct ones of the registers 1702–1709, herein called SRC1 and SRC2, specified as parameters by the $DIV_{13}$ B command are asserted on internal data busses 1734 and 1735;

(B) a distinct third one of the registers 1702–1709, herein called DST, is asserted on internal data bus 1737;

(C) the ALU 1712's A-port shifter 1960 shifts SRC1 one bit to the left, putting the contents of the C (Carry) condition code bit register 1674-0 into the least significant bit of the data value received by the ALU's A-port; the ALU's B-port receives the SCR2 value;

(D) the ALU adds the SRC2 value to the left shifted SCR1 value if QOP equals 1, otherwise it subtracts the SRC2 value from the left shifted SCR1 value; the output value (i.e., result) generated by the ALU is stored back in the SRC1 data register;

(E) the BPU 1714 shifts the DST value one bit to the left and puts the contents of the QB condition code bit register 1674-6 (i.e., the QB value generated in the previous instruction cycle) into the least significant bit of the data value output by the BPU; the output value generated by the BPU is stored back into the DST register; and (F) the sign bits of the output value generated by the ALU and the SRC2 value (on bus 1735) are exclusive-ORed by XOR gate 1963; the 1-bit result produced by of the XOR gate 1963 is stored in the QOP condition code bit register 1674-7 and the inverse of the XOR gate output is stored in the QB condition code bit register 1674-6.

Figure 7:
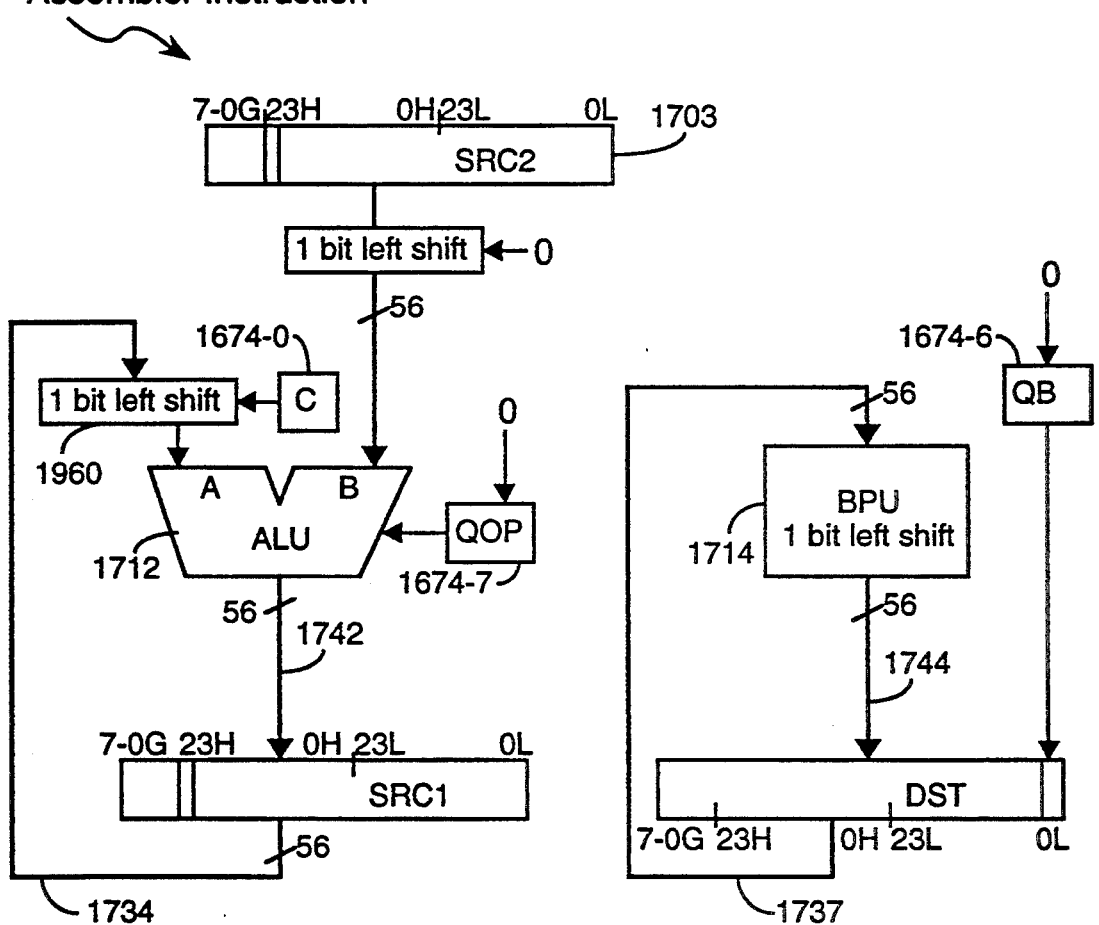
FIG. 7 is a schematic representation of the execution unit of the present invention as configured to perform a third predefined division instruction.

Referring to FIGS. 2 and 7, the $DIV_{13}$ C instruction causes the execution unit 1700 to be configured (by control signals from the local EXU controller 1750) so that:

(A) two distinct ones of the registers 1702–1709, herein called SRC1 and SRC2, specified as parameters by the $DIV_{13}$ C command are asserted on internal data busses 1734 and 1735;

(B) a distinct third one of the registers 1702–1709, herein called DST, is asserted on internal data bus 1737;

(C) the ALU 1712's A-port shifter 1960 shifts SRC1 one bit to the left, putting the contents of the C (Carry) condition code bit register 1674-0 into the least significant bit of the data value received by the ALU's A-port; the ALU's B-port shifter shifts SRC2 one bit to the left and the B-port receives the left shifted SCR2 value;

(D) the ALU adds the left shifted SRC2 value to the left shifted SCR1 value if QOP equals 1, otherwise it outputs the left shifted SCR1 value; the output value (i.e., result) generated by the ALU is stored back in the SRC1 data register;

(E) the BPU 1714 shifts the DST value one bit to the left and puts the contents of the QB condition code bit register 1674-6 (i.e., the QB value generated in the previous instruction cycle) into the least significant bit of the data value output by the BPU; the output value generated by the BPU is stored back into the DST register; and (F) a "0" value is stored in the QB and QOP condition code bit registers 1674-6 and 1674-7.

Figure 8:
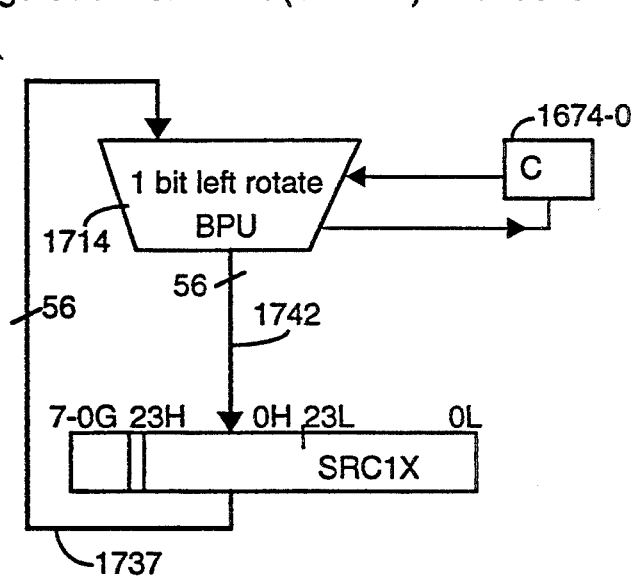
FIG. 8 is a schematic representation of the execution unit of the present invention as configured to perform a rotate with carry instruction.

Referring to FIGS. 2 and 8, the <<RC instruction (Rotate with Carry) causes the execution unit 1700 to be configured (by control signals from the local EXU controller 1750) so that:

(A) a specified one of the registers 1702-1709, herein called SRC1X, specified as a parameter by the <<RC command is asserted on internal data bus 1737; and (B) the BPU 1714 left rotates the SRC1X value, stores the sign data bit (i.e., bit 47 of a data register such as register xd1 1703) of the input SRC1X value to be stored in the C (Carry) condition code bit register 1674-0, and stores the rotated SRC1X value back in the SRC1X register.

Assembly Language Division Routines for Signed Fixed-Point Numbers

Next, we present the assembly language division routines to perform three types of division computations for signed fixed point numbers. In order for a user of the DSP of the preferred embodiment to perform division on a signed fixed point number, the user must store in the DSP's program memory 1400 (or in an external instruction memory) the proper sequence of instructions for efficiently making use of the $DIV_{13}$ A, $DIV_{13}$ B, $DIV_{13}$ C and <<RC instructions to perform the division computation.

In all of the examples below, it is assumed that the dividend and divisor have been normalized such that the absolute value of the dividend is less than the absolute value of the divisor. Typically, normalization is accomplished by using a shod routine such as the following:

| | | |
|---|---|---|
| dmsb xd0, a0 | /*Detect MSB of dividend xd0 | */ |
| dmsb yd0, a1 | /*Detect MSB of dividend xd0 | */ |
| xd0 = xd0 <<1a0 | /*Normalize dividend | */ |
| yd0 = yd0 <<1a1 | /*Normalize divisor | */ |
| a1 = a1-a0 | /*Compute Denormalization amount | */ |
| xd0 = xd0 <<a-1 | /*Arithmetic right shift adjusts dividend | */ |
| | /*to ensure \|xd0\| < \|yd0\| | */ |
| a1 = a1-1 | /*Adjust denormalization amount | */ | where "dmsb" is the "detect MSB" instruction, "<<l" is the rotate left instruction and "<<a" is the arithmetic rotate instruction and a negative parameter for the arithmetic rotate instruction indicates a right shift operation.

This routine detects the position of the most significant bits of the dividend and divisor, shifts the dividend and divisor to so that the most significant bit of each is in the same bit position, shifts the dividend back one position to ensure that the dividend is smaller than the divisor, and computes the number of bit positions that the quotient will have to be shifted to compensate for the normalization of the dividend and divisor.

The corresponding post processing routine (performed after the division computation is completed) that compensates for the normalization of the dividend and divisor is as follows:

$a0 = a0 << ra1$

Division Routine for 2N bit Dividend and N bit Divisor

The division routine for dividing a 2N bit signed dividend by a N bit signed divisor is as follows:

| | |
|---|---|
| clear xd1 | /*Clear C flag in condition code register*/ |
| DIV_A (xd0, yd0) | /*Compute initial QB and QOP values*/ |
| Repeat L1 N-1 | /*Store Repeat Value for DIV_B instrctn*/ |
| | /*N is typically a value of 16, 24, or 32*/ |
| DIV_B (xd0, yd0, a0) | /*this instruction is repeated N-1 times*/ |
| L1: DIV_C (xd0, yd0, a0) | |

The xd0 register initially stores the dividend, and at the completion of the division routine stores the remainder value in its N most significant bits. The A0 register stores the quotient in its N least significant bits. Any three of the eight data registers 1702-1709 can be used for the dividend, divisor and quotient, as long as three different registers are used.

Figure 9:
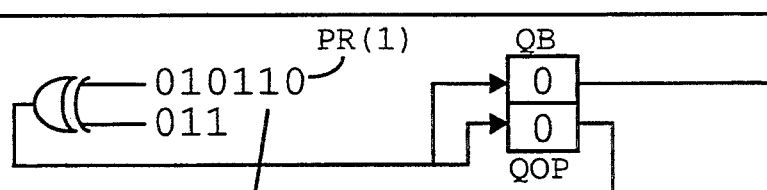
FIG. 9 is a flow chart of operations performed by the present invention to divide a specified positive 2N bit dividend by a specified positive N bit divisor.
Figure 10:
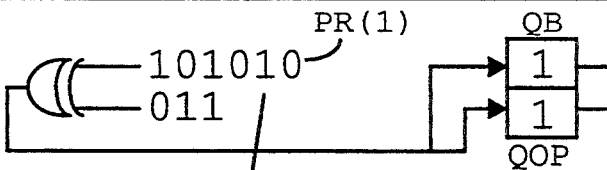
FIG. 10 is a flow chart of operations performed by the present invention to divide a specified negative 2N bit dividend by a specified positive N bit divisor.
Figure 12:
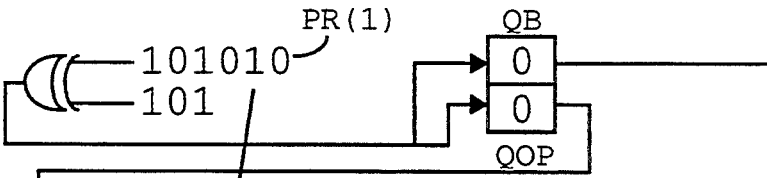
FIG. 12 is a flow chart of operations performed by the present invention to divide a specified negative 2N bit dividend by a specified negative N bit divisor.

FIGS. 9, 10, 11 and 12 show numerical examples of the execution of the above division routine, where a value of N=3 is used for simplicity. In FIG. 9 a positive 2N bit dividend is divided by a positive N bit divisor. In FIG. 10 a negative 2N bit dividend is divided by a positive N bit divisor. In FIG. 11 a positive 2N bit dividend is divided by a negative N bit divisor. In FIG. 12 a negative 2N bit dividend is divided by a negative N bit divisor.

Division Routine for 2N bit Dividend and 2N bit Divisor

The division routine for dividing a 2N bit signed dividend by a 2N bit signed divisor is as follows:

| | |
|---|---|
| clear xd1 | /*Clear C flag in condition code register*/ |
| DIV_A (xd0, yd0) | /*Compute initial QB and QOP values*/ |
| Repeat L2 2N-1 | /*Store Repeat Value for DIV_B instrctn*/ |
| DIV_B (xd0, yd0, a0) | /*this instruction is repeated N-1 times*/ |
| L1: DIV_C (xd0, yd0, a0) | |

The xd0 register initially stores the dividend. The value left in the xd0 register after the division routine is the lower 2N bits of the 4N bit remainder value (the upper 2N bits of which are all 0's), although that remainder is usually not used in digital signal processing applications. The A0 register stores the 2N bit quotient. Any three of the eight data registers 1702-1709 can be used for the dividend, divisor and quotient, as long as three different registers are used.

Figure 13A:
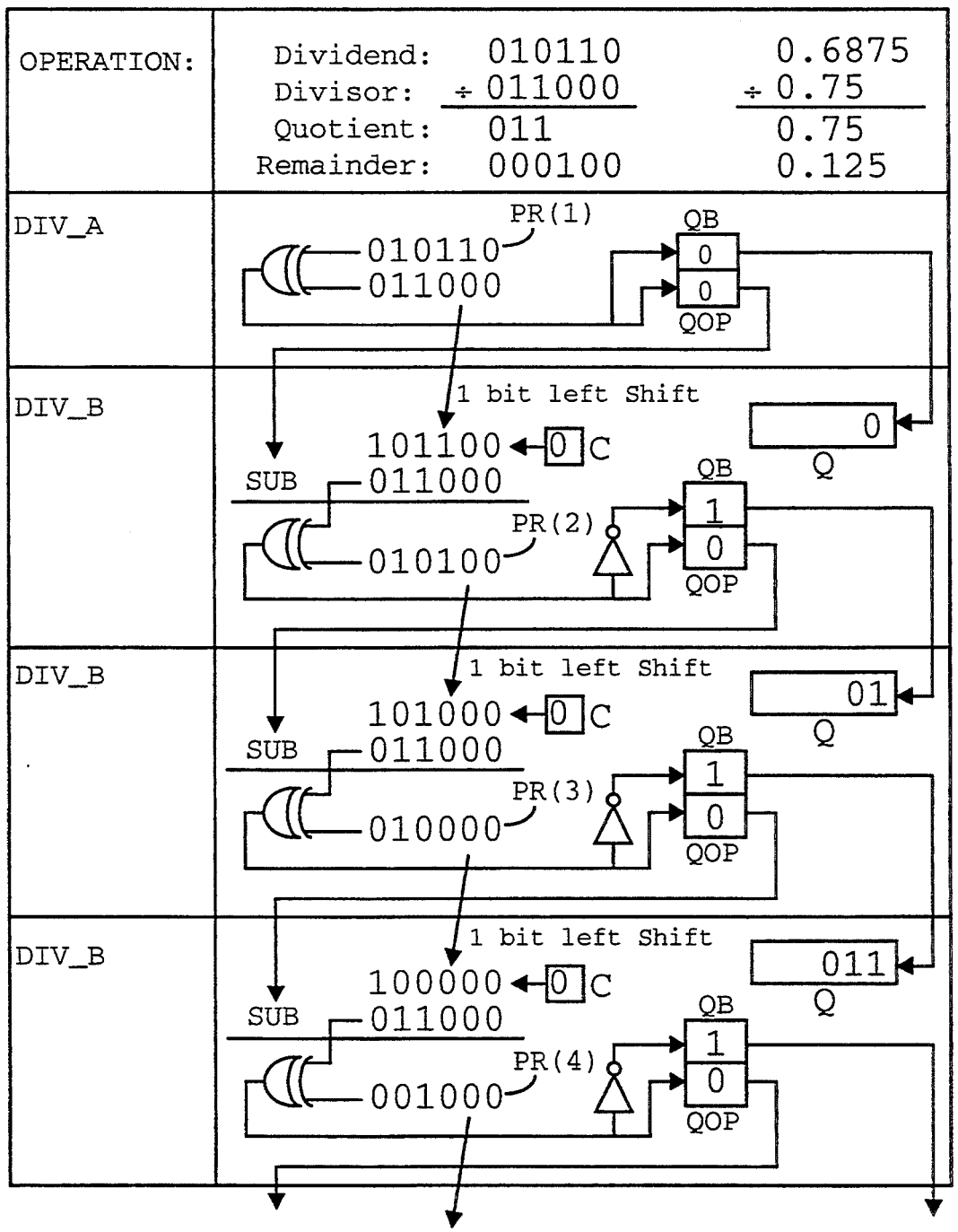
FIG. 13 is a flow chart of operations performed by the present invention to divide a specified signed 2N bit dividend by a specified signed 2N bit divisor.
Figure 13B:
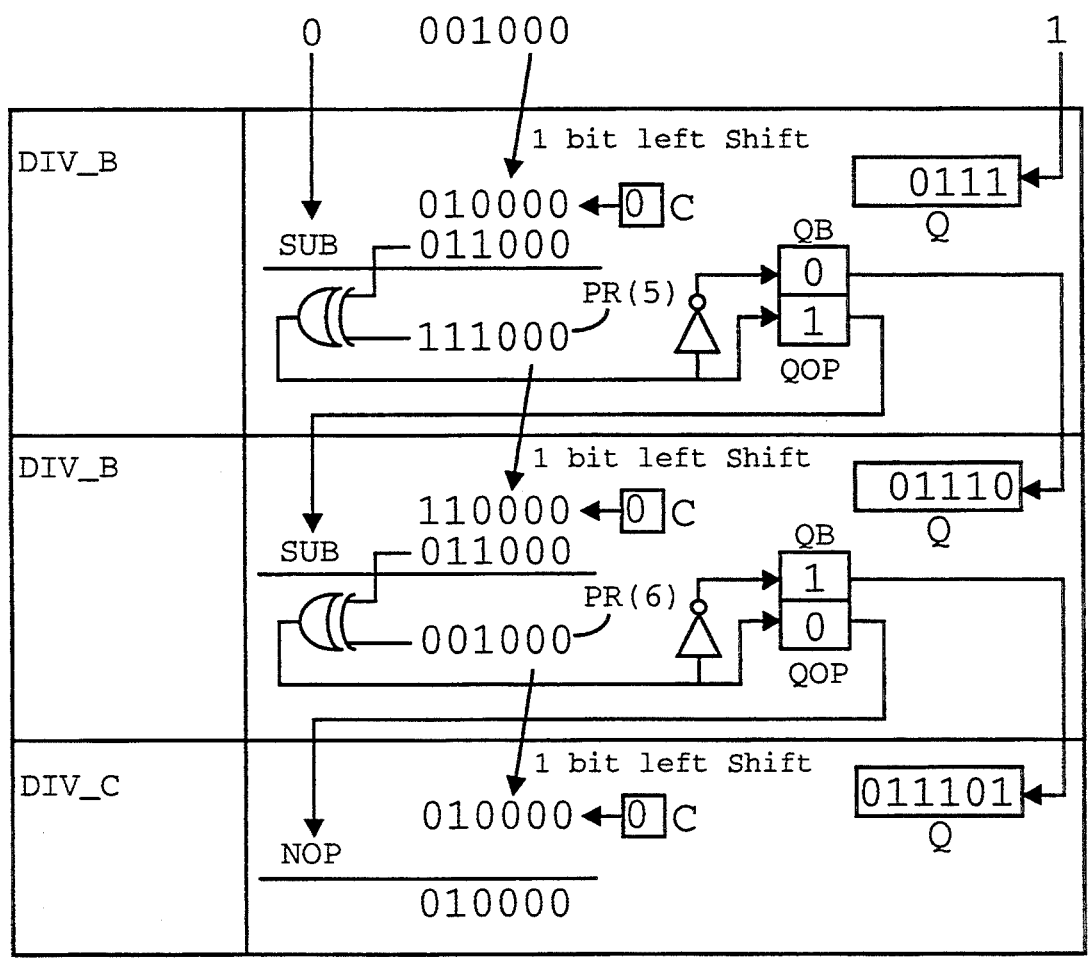

FIG. 13 shows a numerical example of the execution of the above division routine, where a value of N=3 is used for simplicity. Since the dividend and divisor are both six bits long, the $DIV_{13}$ B instruction is executed five times, followed by one execution of the $DIV_{13}$ C instruction. The $DIV_{13}$ C instruction must be executed, even though no remainder value is produced, because the $DIV_{13}$ C instruction stores the last quotient bit (computed by the last $DIV_{13}$ B instruction) in the destination register.

Division Routine for 4N bit Dividend and 2N bit Divisor

The division routine for dividing a signed 4N bit dividend by a signed 2N bit signed divisor is as follows:

| | |
|---|---|
| DIV_A (xd0, yd0) | /*Compute initial QB and QOP values*/ |

```
        xd1 = xd1 <<RC 1      /*Rotate xd1 with carry by one
                                bit position*/
        Repeat L3 2N-1        /*Store Repeat Value for DIV_B
                                instrctn*/
            DIV_B (xd0, yd0, a0)
            xd1 = xd1 <<RC 1
        L3: DIV_C (xd0, yd0, a0)
```

The xd0 and xd1 registers initially store the double precision dividend. The yd0 register stores the divisor. The value left in the xd0 register after the division routine is the 2N bit remainder value. The a0 register stores the 2N bit quotient. Any four of the eight data registers 1702–1709 can be used for the dividend, divisor and quotient, as long as four different registers are used.

The purpose of the <<RC rotate with carry instruction is to shift the most significant bit (i.e., bit 47) of the extended dividend value from xd1 into the least significant bit (i.e., bit 0) of the xd0 register, via the C condition code bit register, for each execution of the $DIV_{13}$ B and $DIV_{13}$ C instructions.

Figures 14, 14A:
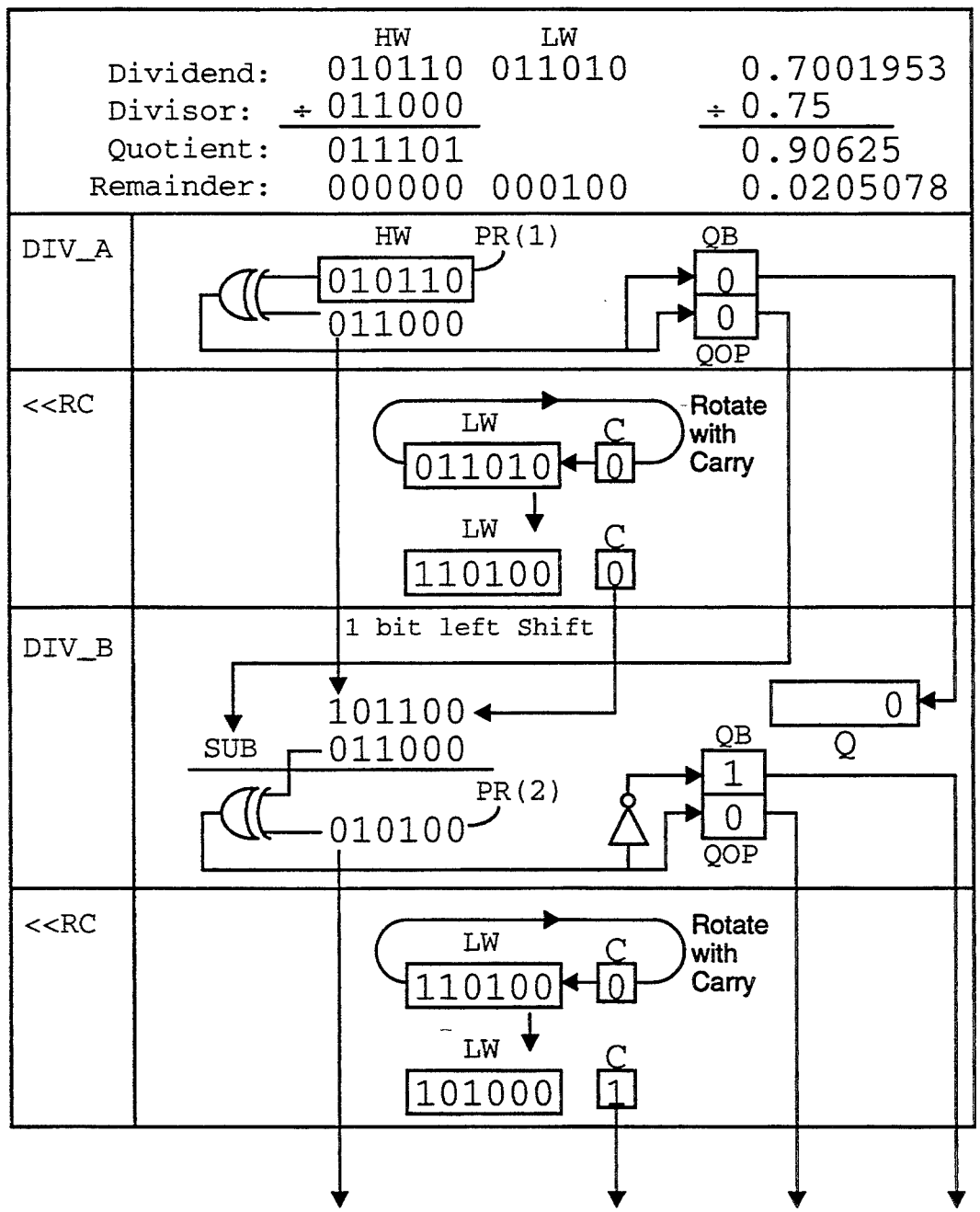
FIG. 14 is a flow chart of operations performed by the present invention to divide a specified signed 4N bit dividend by a specified signed 2N bit divisor.
Figure 14B:
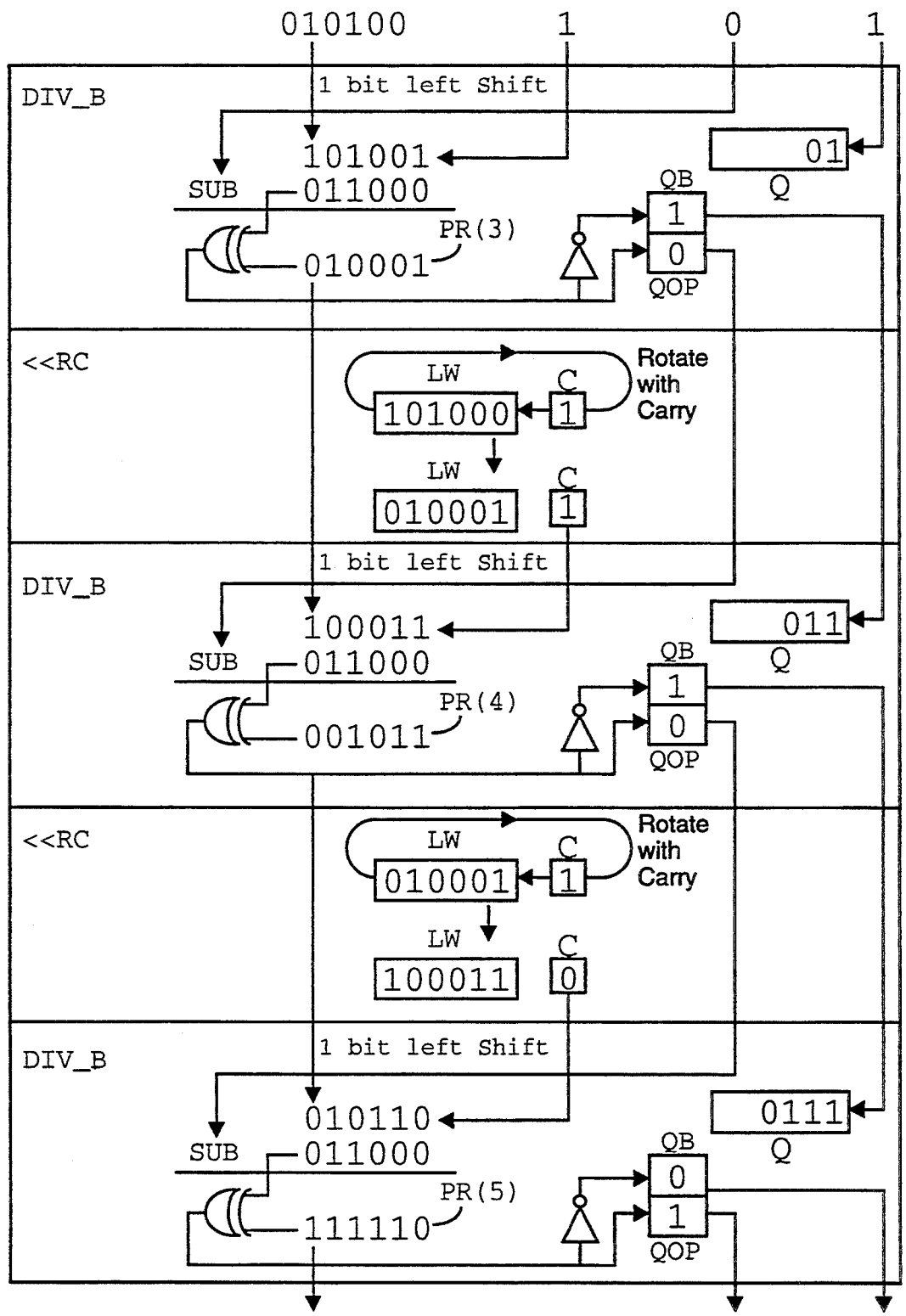
Figure 14C:
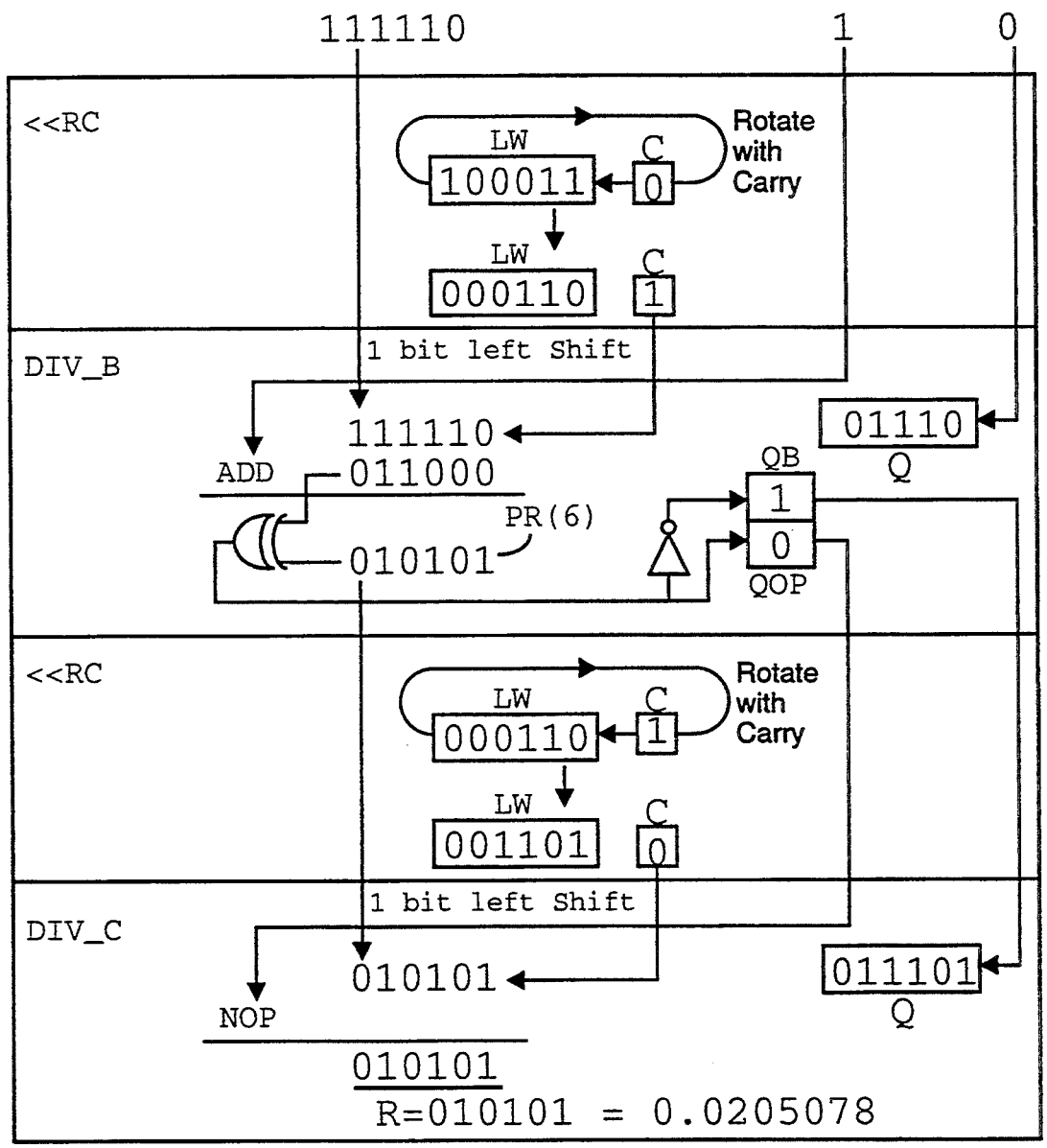

FIG. 14 shows a numerical example of the execution of the above division routine, where a value of N=3 is used for simplicity. Since the dividend is 12 bits long and divisor is 6 bits long, the $DIV_{13}$ B and <<RC instructions are executed five times in sequence (i.e., for a total of ten instruction cycles in the repeat loop), followed by one execution of the $DIV_{13}$ C instruction. Note that while the first rotate with carry instruction causes the pre-existing bit value stored in the C condition code bit register to be stored in the least significant bit of xd1, that bit is never shifted into the xd0 dividend register and therefore does not affect the computation.

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

For instance, the rotate with carry instruction is performed by the BPU in the preferred embodiment, but could be performed by the ALU in an alternate embodiment using an "arithmetic one bit left shift" instruction that supplies the Carry bit flag register with the most significant bit of the dividend's lower 2N bits. For division operations with a 4N bit dividend, a dedicated register could be used (in place of the Carry bit register 1674-0) to transpod a bit from the lower dividend register to the upper dividend register. In alternate embodiments the QOP and QB values could be generated from the ALU input values SRC1 and SRC2 and used immediately, avoiding the need to store the QOP and QV values in bit registers and also avoiding use of the $DIV_{13}$ A instruction. In addition, while N, the number of bits in a single precision number, is equal to 16, 24 and 32 in the preferred embodiments, in other embodiments N will typically be a number greater than or equal to 16.

What is claimed is:

1. A double precision division circuit, comprising:
a data bus having a data path N bits wide;
data registers that store first and second portions of a signed 4N bit dividend, a signed 2N bit divisor, and a signed 2N bit quotient; said dividend, divisor and quotient each including a sign bit; said first and second portions of said 4N bit dividend being stored as two 2N bit values in two distinct data registers;
an arithmetic logic unit (ALU) coupled to said data registers for receiving from said data registers said first portion of said signed 4N bit dividend and said signed 2N bit divisor, for performing specified arithmetic operations to generate an output value having a sign bit and for replacing said first portion of said signed 4N bit dividend stored in said data registers with said output value;
logic circuitry coupled to said ALU for generating an operation bit value QOP and a quotient bit QB in accordance with said sign bit of said signed 2N bit divisor and said sign bit of one of said output value and said signed 4N bit dividend;
shift circuitry for receiving said signed 2N bit quotient from said data registers, for shifting into said received value said quotient bit QB to generate an updated 2N bit quotient, and for storing said updated 2N bit quotient in said data registers; and
an execution controller coupled to said ALU, shift circuitry and logic circuitry for performing a sequence of predefined instructions in a sequence of instruction cycles to generate and store said updated 2N bit quotient in said data registers, including repeatedly executing a predefined set of instructions that cause said ALU and logic circuitry to generate said operation bit value QOP and quotient bit QB, to update said first portion of said dividend in accordance with said operation bit value QOP, to shift said quotient bit QB into said 2N bit quotient to generate said updated 2N bit quotient and to store said updated 2N bit quotient in said data registers, and to transfer one bit from said second portion of said dividend value into said first portion of said dividend value;
whereby each execution of said set of instructions generates a quotient bit and transfers one bit of said dividend from said second portion to said first portion of said dividend.

2. The double precision division circuit of claim 1, wherein said execution controller, when executing a first one of predefined set of instructions, transfers said one bit from said second portion of said dividend value into a carry bit register associated with said ALU, and when executing a second one of said predefined set of instructions, transfers said one bit from said carry bit register into said first portion of said dividend value.

3. A double precision division circuit, comprising:
a data bus having a data path N bits wide;
data registers, each storing a 2N bit value, wherein first and second ones of said data registers respectively store upper and lower halves of a signed double precision 4N bit dividend, a third one of said data registers stores a signed 2N bit divisor, and a fourth one of said data registers stores a signed 2N bit quotient; said data registers coupled to said data bus for transferring data values to and from said data registers; said 2N bit value stored by each data register including a sign bit;
an arithmetic logic unit (ALU) coupled to said data registers for receiving source values from said first and third data registers, and for performing specified arithmetic operations to generate an output value having a sign bit;
logic circuitry coupled to said ALU for receiving the sign bit of the divisor value and the sign bit of the output value generated by said ALU and for generating an operation bit value QOP and a quotient bit QB from said sign bits in accordance with predefined criteria;

first, second and third bit registers for storing said operation bit QOP, quotient bit QB, and a data bit, respectively;

a bit processor unit (BPU) for receiving the value stored in said fourth data register, for shifting said received value and inserting said quotient bit QB stored in said second bit register into said received value to generate an updated 2N bit quotient, and for storing said updated 2N bit quotient in said fourth data register; and an execution controller coupled to said ALU, BPU and logic circuitry for performing a sequence of predefined instructions in a sequence of instruction cycles to generate and store said updated 2N bit quotient in said fourth data register, including alternately executing a division instruction and a rotate instruction multiple times, wherein said division instruction causes said ALU and logic circuitry to generate said operation bit value QOP and quotient bit QB, to store said QOP and QB values in said first and second bit registers, and to shift said data bit stored in said third bit register into said 2N bit value stored in said first data register, and causes said BPU to insert said quotient bit QB stored in said second bit register during a previous execution of said division instruction into said updated 2N bit quotient and to store said updated 2N bit quotient in said fourth data register; and wherein said rotate instruction causes one of said ALU and BPU to rotate said 2N bit value stored in said second data register and to store a predefined bit of said 2N bit value stored in said second data register in said third bit register;

whereby in alternating instruction cycles a quotient bit is generated and one bit of said dividend is transferred from said second data register into said first data register.

4. The double precision division circuit of claim 3, wherein said first bit register is a carry bit register used by said ALU to store a carry bit.

5. A method of performing a double precision division computation, comprising the steps of:

storing first and second portions of a signed 4N bit dividend as two 2N bit values in respective first and second data registers, storing a signed 2N bit divisor in a third data register, and providing a fourth data register for storing a signed 2N bit quotient; said dividend, divisor and quotient each including a sign bit;

providing an arithmetic logic unit (ALU) coupled to said data registers for receiving from said data registers said first portion of said signed 4N bit dividend and said signed 2N bit divisor, for performing specified arithmetic operations to generate an output value having a sign bit and for replacing said first portion of said signed 4N bit dividend stored in said data registers with said output value;

providing logic circuitry coupled to said ALU for generating an operation bit value QOP and a quotient bit QB in accordance with said sign bit of said signed 2N bit divisor and said sign bit of one of said output value and said signed 4N bit dividend; and performing a sequence of predefined instructions in a sequence of instruction cycles to generate and store an updated 2N bit quotient in said data registers, including repeatedly executing a predefined set of instructions that cause said ALU and logic circuitry to generate said operation bit value QOP and quotient bit QB, to update said first portion of said dividend in accordance with said operation bit value QOP, to shift said quotient bit QB into said 2N bit quotient to generate said updated 2N bit quotient and to store said updated 2N bit quotient in said data registers, and to transfer one bit from said second portion of said dividend value into said first portion of said dividend value;

whereby each execution of said set of instructions generates a quotient bit and transfers one bit of said dividend from said second portion to said first portion of said dividend.

6. The method of claim 5, wherein said step of performing a sequence of predefined instructions includes transferring said one bit from said second portion of said dividend value into a carry bit register associated with said ALU when executing a first one of said predefined set of instructions and transferring said one bit from said carry bit register into said first portion of said dividend value when executing a second one of said predefined set of instructions.

7. A method of performing a double precision division computation, comprising the steps of:

storing a signed double precision 4N bit dividend as two 2N bit values in first and second data registers, storing a signed 2N bit divisor in a third data register, and providing a fourth data register for storing a signed 2N bit quotient;

providing an arithmetic logic unit (ALU) coupled to said data registers for receiving source values from said first and third data registers, and for performing specified arithmetic operations to generate an output value having a sign bit;

providing logic circuitry coupled to said ALU for receiving the sign bit of the divisor value and the sign bit of the output value generated by said ALU and for generating a next operation bit value QOP and a quotient bit QB from said sign bits in accordance with predefined criteria; and performing a sequence of predefined instructions in a sequence of instruction cycles to generate and store said 2N bit quotient in said fourth data register, including alternately executing a division instruction and a rotate instruction multiple times;

wherein executing said division instruction includes shifting a data bit stored in a first bit register into said 2N bit value stored in said first data register; generating with said ALU and logic circuitry said next operation bit value QOP and quotient bit value QB; storing said QOP and QB bit values in second and third bit registers, respectively; prior to storing said QOP and QB values, inserting said quotient bit QB stored in said third bit register during a previous execution of said division instruction into said 2N bit quotient; and storing said 2N bit quotient in said fourth data register; and executing said rotate instruction includes rotating said 2N bit value stored in said second data register and storing a predefined bit of said 2N bit value stored in said second data register in said first bit register such that a different bit of said dividend is transferred from said second data register into said first bit register during each successive execution of said rotate instruction.

8. The method of claim 7, wherein said first bit register is a carry bit register used by said ALU to store a carry bit.

* * * * *